Patented Jan. 5, 1932

1,839,660

UNITED STATES PATENT OFFICE

GEORGE H. ELLIS, OF ST. PAUL, MINNESOTA, ASSIGNOR TO THE INSULITE COMPANY, OF MINNEAPOLIS, MINNESOTA, A CORPORATION OF MINNESOTA

PROCESS FOR MAKING WATERPROOF INSULATING BODIES

No Drawing. Application filed August 10, 1929. Serial No. 385,081.

This invention relates to the production of stiff, hard, water-proof, vermin-proof bodies, for use in various constructions for lining, patching, etc., and includes products formed from ligno-cellulosic materials. The production of these bodies is partly based on the discovery of the herein discovered property of sulphur, by which when it is combined with fibrous materials, including cellulosic materials, under heat and pressure, a board having a given tensile strength is produced by the application of a smaller amount of heat and/or pressure. There are various ways in which the invention can be carried out, and practical examples are given herein more for the purpose of illustrating applications of discovery, than as limitations in regard to details. It will be understood, therefore, that the broad feature of the invention is based on the use of sulphur with fibrous materials including cellulosic materials, to produce products having each or all of the qualities above mentioned.

An object is also the production, from natural wood including waste pieces from sawmills, of a hard, water-proof, board-like product having practically all the characteristics of natural wood, and having the same or increased density.

Objects, features and advantages will appear in the description.

One method for producing the products herein is as follows: A suitable material is fiberized by pulping and hydrating in any desired manner, and the pulp is then delivered into any suitable machine, such as a felting machine, and a sheet is produced which is soft, porous, and air-filled, and which may have specific gravity ranging from .2 to about .3. This porous, sheet-like product is then dried by heat without pressure. The sulphur is now applied to opposite faces of the porous sheet product, either by brushing or spraying, preferably the latter. A discussion of the various forms of sulphur and proportions of sulphur to water in sulphur emulsions, as well as ways of applying the sulphur will be given herebelow.

The sulphur treated porous sheet is now delivered to a suitable press, and heat and pressure are applied. The sprayed or painted coating of sulphur is substantially dry before entry into the press. 300 lbs. pressure at a temperature corresponding to 120 lbs. steam pressure are applied for from 15 to 30 minutes. The specific gravity of the product is then about .8, and the product is about $\frac{3}{16}$ of an inch thick. It has been found best to remove the product from the press while it is hot to prevent sticking.

It has been found best to press slowly. First bring the press against the board so that the hot plates are in firm contact at a pressure of about ten pounds per square inch. Maintain this pressure from one to one and one-half minutes, then increase the pressure up to the full amount of 300 lbs., which pressure will be reached at the end of about a minute. Then let the press remain at this higher pressure for the balance of the period of from 15 to 30 minutes.

The sulphur emulsion is prepared by adding 15 parts by weight of sulphur to 85 parts by weight of water. The sulphur solution is sprayed upon the porous sheet before it is put into the press. At present the sheet is merely passed between spraying nozzles vertically arranged at opposite face sides of the sheet.

In order to prevent sticking in the press, about 4 to 22 per cent of talc by weight is added to the sulphur solution. This talc can be put into the pulp batch before the lightweight board is formed. The best per cent of talc thus far is 5 per cent.

The sulphur solution is prepared by using granulated sulphur and mixing the same with water in a paint grinder. After mixing it has substantially the consistency and color of cream.

Another valuable discovery is that the sulphur solution will take color and therefore dyes are mixed with the solution before application, and are found to successfully color the surface of the product apparently without any interference with the chemical action which results in water-proofing and stiffening the product, and the giving of a product of high tensile strength by application of heat over a short period of time.

By applying the sulphur to both sides of the board before dry pressing, a water-proof finish is provided on both sides so that the resistance to absorption of moisture is equal, and therefore the warping tendency is reduced substantially to zero. Over long test periods, no warping is observable.

It seems that the best results are obtained when the sulphur is applied to the dry board, and that the board should, therefore, be thoroughly dry when the sulphur is applied. The sulphur solution is fluid at 300° F., sticky at 400° F. and again fluid at 450° F. The desirable press temperature is, therefore, about 300° F. for at this temperature the sulphur solution will remain fluid, and the product will not be scorched.

Another method for carrying out the invention consists in making a comparatively soft fiber sheet-like product, applying granulated sulphur to opposite faces of greatest area and then pressing and heating the same while dry, and after partly granulated sulphur has been applied to both sides. Thus far the best proportion of granulated sulphur is about 100 lbs. to 2,000 square feet of board surface (the thickness of the soft board being about half an inch) divided between the surfaces.

Excellent results are obtained by using an emulsion of sulphur. The rock sulphur is ground and the emulsion is obtained by adding 85 parts by weight of water to 15 parts by weight of sulphur. Another proportion which has been found to give very good results is 60 parts by weight of water to 1 part by weight of sulphur. The discovery of the new property of sulphur as applied in this art, as well as the proportions of sulphur to water within the range of 90 per cent of water to 10 per cent of sulphur is claimed.

The use of sulphur has been found to reduce the amount of needed pressure and/or heat, and to produce a stiff warp-proof, waterproof, vermin-proof product very cheaply. The discovery has, therefore, been made that the use of sulphur in the manner stated, and probably in other manners, has the effect of giving a harder water-proof, vermin-proof, board having a greater tensile strength, by the application of a minimum amount of pressure and/or heat in the making, and a minimum amount of time over which the pressure and heat is applied. The exact nature of the discovered action of the sulphur in making a stiffer board product at less pressure, heat and time is not thoroughly known, but the experiments indicate clearly that such a result is produced. No doubt the phenomena result from both physical and chemical changes due to addition of sulphur.

The following comparative data is given as illustrating the discovery, this data along with other data having evolved during experiments. Working with a soft felted, dried material one-half an inch thick, and pressing this dry material without the application of sulphur, it was found that at 350° F., and at 1100 lbs. press pressure applied for two hours, a board was produced having a tensile strength of about 1485 lbs. per square inch. With the same sort of board and after the application of sulphur and at 350° F. under a press pressure of 310 pounds for 15 minutes, a board was produced having a tensile strength of 1623 lbs. per square inch. Again operating without the application of sulphur and at 350° F., 1100 lbs. pressure for 15 hours, a board was produced having a tensile strength of 2120 lbs. per square inch, which is not a very greatly increased tensile strength over that of the sulphur-treated pressed product produced in 15 minutes (as compared with 15 hours) and at 310 lbs. press pressure per square inch instead of 1100 lbs.

The emulsified sulphur in proportion 20 to 1 has been put into the pulp when making the comparatively soft board. If an emulsion of this proportion is used and it is applied to the board surfaces instead of being put in the pulp batch, it should be applied with a brush, instead of being sprayed on.

If a twenty to one sulphur emulsion is used, it should be put into the beater preferably toward the end of the beating operation to prevent settling and maintain a uniform mixture. It must be noted that it is cheaper to spray or brush the sulphur than to put it into the beater because somewhat less sulphur is required. However, in certain instances this is a negligible consideration.

Experiments have also shown that granulated sulphur produces a board having all the qualities produced by the use of a sulphur solution. By using granulated sulphur the needed amount of pressure and heat, and time for the production of a product having a given tensile strength, is reduced as when other forms of sulphur are used. It, therefore, clearly appears that the use of sulphur (in the manner stated and probably in other manners not now known) has the effect of giving a harder board at less pressure and/or heat, or at less pressure and less time of pressure application.

The present invention is related to my co-pending application, Serial Number 385,082, filed August 10th, 1929, for insulating bodies (of the flexible and inflexible types) to the extent that part of the process for producing the products herein is somewhat similar to that used for the products mentioned in the above entitled application. In both cases, fibrous materials, including cellulosic materials, are used and in both cases a soft, porous sheet is first produced, and this sheet is then dried, and then simultaneous heat and pressure are applied to it. One of the principal differences between the above mentioned case and the present one is that in the present case sulphur is used to obtain stiff, hard, strong, water-proof, vermin-proof insulating bodies, and is incorporated before applying heat and pressure. The two cases are somewhat related because the present discovery was made during experiments which led to the production of products mentioned in the above entitled application.

Of course, it is not always necessary to apply the sulphur to a porous sheet. The sulphur can be applied to a sheet of any density and texture and when that sheet is heated, and pressed, to change its physical characteristics, for example to increase its tensile strength, it will be found that a product having a given tensile strength can be obtained with less pressure and/or heat as the result of the incorporation of sulphur before the pressing or heating operations. The best results thus far are obtained by the simultaneous application of heat and pressure to the sulphurized material.

The emulsion may be applied in two ways, either by adding to the beater during the pulping operation, or by applying to the surface of a porous or non-porous sheet formed from the pulp. In both instances, the sheet formed from the pulp is submitted simultaneously to heat and pressure after the sulphur is incorporated. The best results are obtained by first forming the porous air-filled sheet from the pulp, and then applying the sulphur emulsion to opposite face sides of greatest area, and then simultaneously heating and pressing to increase the density, and reduce the thickness and form a stiff, hard, water-proof, vermin-proof board.

Although the specific ranges above set forth are claimed, there is no intention to be limited to them because the product is based on the discovery of the property of sulphur above set forth, for the present purpose. It is again to be noted that by the use of sulphur a board of a certain tensile strength can be produced at a given pressure and temperature in less time.

The mere addition of the sulphur either to the liquid pulp before formation into a sheet, or before or during heat and pressure, is claimed broadly irrespective of the time or the manner or the form in which it is applied. An advantage and a feature is the application of sulphur to both sides so that it will have the same surface finish and will have equal resistance to the absorption of moisture. This method tends to minimize or entirely eliminate warp.

I claim as my invention:

1. A process for producing a stiff waterproof, vermin-proof sheet, which consists in forming from pulped cellulosic material a soft porous air-filled sheet, drying the sheet by the application of heat, applying sulphur, and then applying pressure, while applying sufficient heat to make and to maintain a fluid condition of the sulphur, without scorching the product.

2. A process for producing a stiff waterproof, vermin-proof sheet, which consists in forming from raw pulped wood a soft porous air-filled sheet, drying the sheet by the application of heat, applying sulphur, and then applying pressure, while applying sufficient heat to make and to maintain a fluid condition of the sulphur, without scorching the product.

3. A process for producing a stiff waterproof, vermin-proof sheet which consists in forming from pulped wood, a soft porous air-filled sheet, drying the sheet by the application of heat, applying an emulsion of sulphur, drying, and applying pressure, while applying sufficient heat to make and to maintain a fluid condition of the sulphur, without scorching the product.

4. A process for producing a stiff-waterproof, vermin-proof sheet which consists in forming from pulped wood a soft porous air-filled sheet, drying the sheet by the application of heat, applying sulphur, drying, and applying approximately three hundred pounds pressure per square inch for from fifteen to thirty minutes, while applying sufficient heat to make and to maintain a fluid condition of the sulphur, without scorching the product.

5. A process for producing a stiff waterproof, vermin-proof sheet which consists in forming from pulped wood a soft porous air-filled sheet, drying the sheet by the application of heat, applying sulphur, drying, and applying approximately three hundred pounds pressure, while applying sufficient heat to make and to maintain a fluid condition of the sulphur, without scorching the product.

6. A process for producing a stiff waterproof, vermin-proof sheet which consists in forming from raw pulped wood a soft porous air-filled sheet having specific gravity ranging from 0.2 to 0.3, drying the sheet by the application of heat, applying granulated sulphur, drying, and applying approximately three hundred pounds pressure per square inch for from fifteen to thirty minutes, while applying sufficient heat to make and to maintain a fluid condition of the sulphur, without scorching the product, to produce a body having a specific gravity of approximately 0.8.

7. A process for producing a stiff waterproof, vermin-proof sheet which consists in forming from raw pulped wood a soft porous thick sheet, applying granulated sulphur to the opposite faces of the sheet, drying, and applying approximately three hundred pounds pressure at a temperature corresponding to one hundred twenty pounds of steam pressure for from fifteen to thirty minutes.

8. A process for producing a stiff waterproof, vermin-proof sheet which consists in forming from pulped wood a soft porous thick slab, drying the slab by the application of heat, applying sulphur to the opposite faces of the slab, drying, applying a press pressure while heating, and then removing the product from the press while hot.

9. A process for producing a stiff waterproof, vermin-proof sheet which consists in forming from pulped wood a soft porous thick sheet, drying the sheet by the application of heat, applying sulphur, applying sufficient heat to make the sulphur fluid, and pressing by first applying a relatively small pressure, and maintaining this pressure from approximately one to one and one-half minutes, then for the period of about one minute increasing the pressure until it is approximately three hundred pounds per square inch, and then maintaining this higher pressure for a period of from approximately fifteen to thirty minutes.

In witness whereof I have hereunto set my hand this 6th day of August, 1929.

GEORGE H. ELLIS.